Jan. 19, 1937.     D. C. SIMPSON     2,068,202
MANUFACTURE OF GLASS WOOL
Original Filed Nov. 29, 1932     3 Sheets-Sheet 2
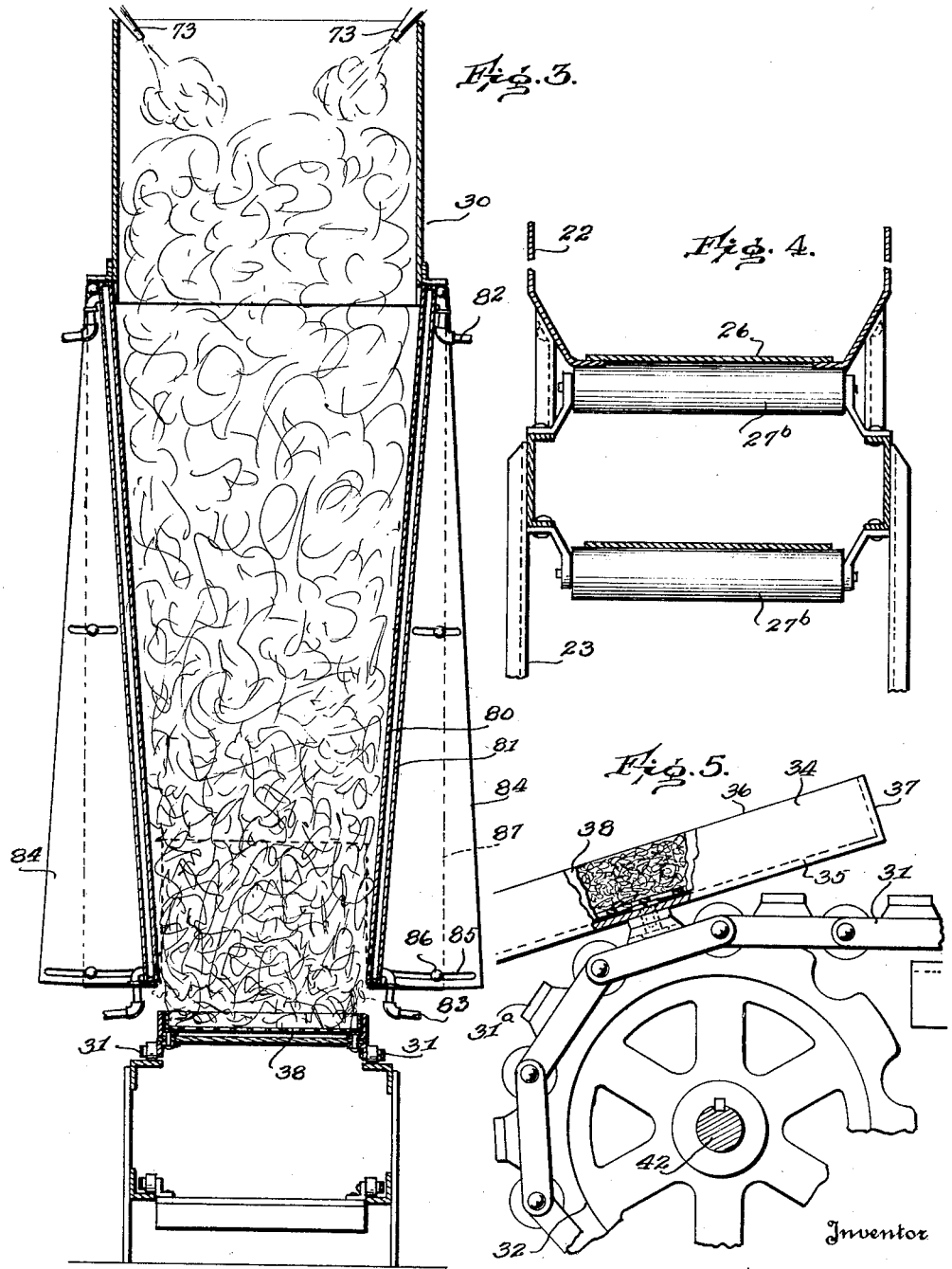
Inventor
Donald C. Simpson
by J. F. Rule
Attorney

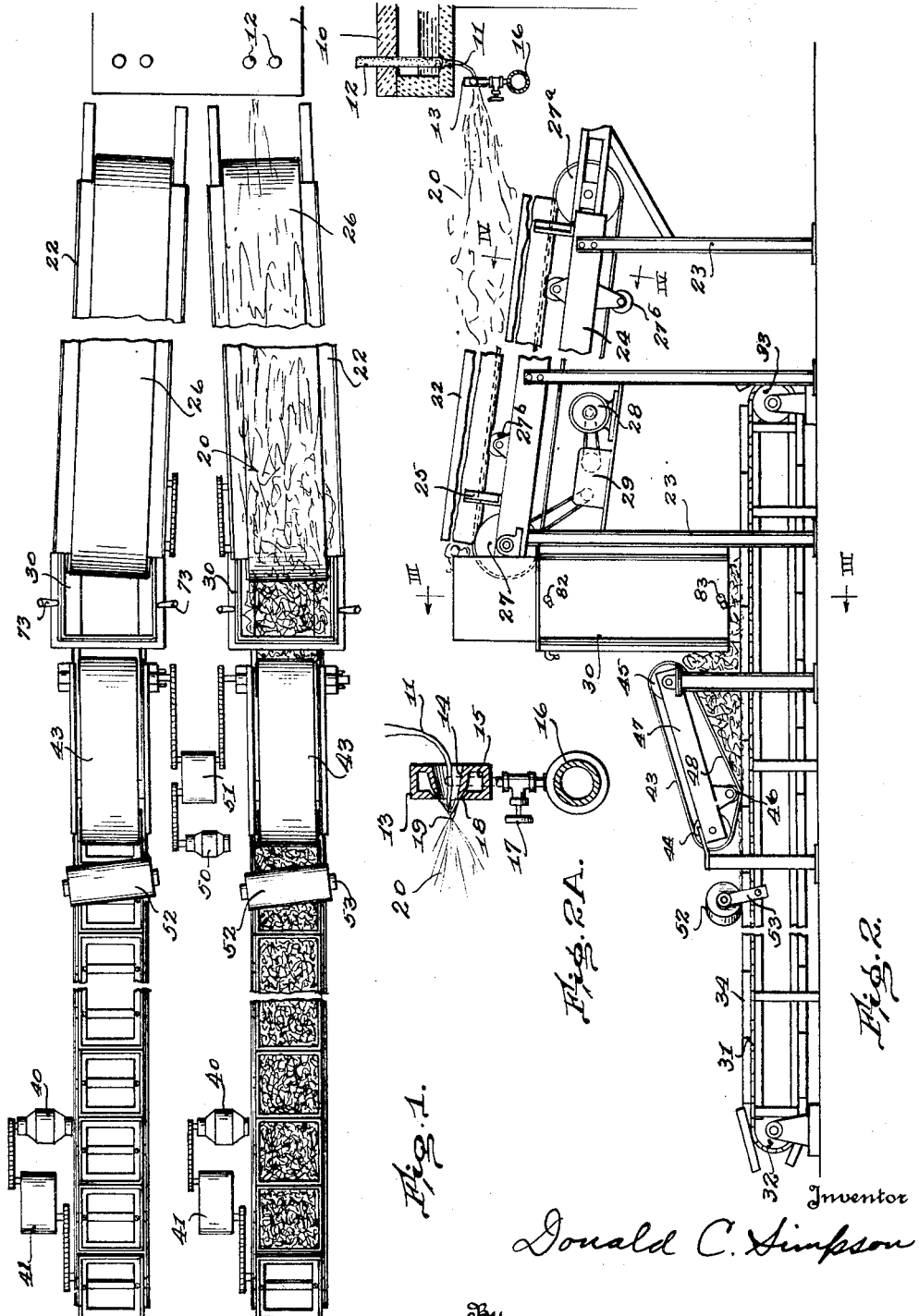

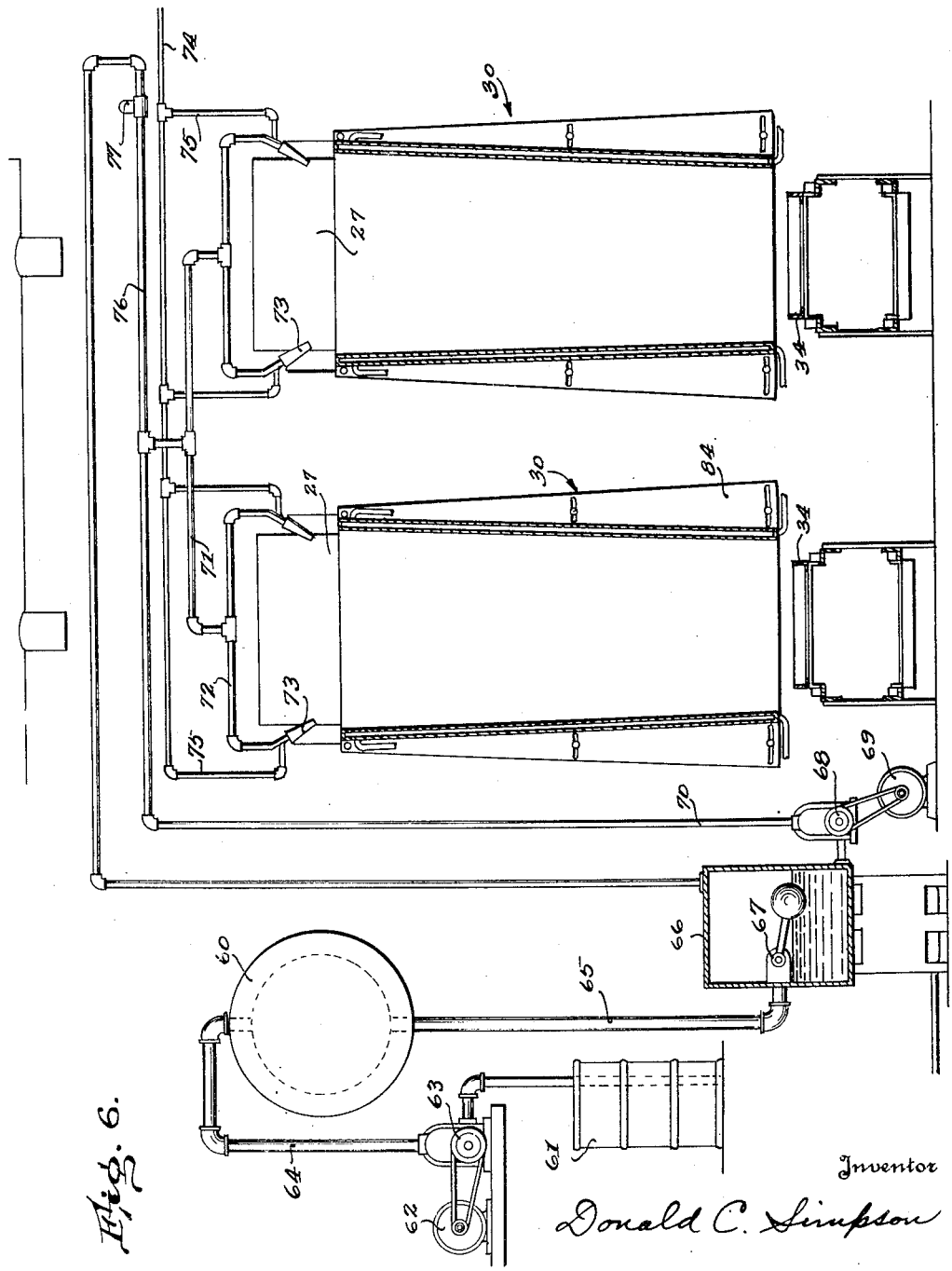

Patented Jan. 19, 1937

2,068,202

UNITED STATES PATENT OFFICE 2,068,202

MANUFACTURE OF GLASS WOOL

Donald C. Simpson, Newark, Ohio, assignor to Owens-Illinois Glass Company, a corporation of Ohio Application November 29, 1932, Serial No. 644,814
Renewed March 25, 1936

14 Claims. (Cl. 154—27)

My invention relates to the manufacture of a fibrous, refractory or vitreous material such as fibrous glass or glass wool, and the fabrication of articles comprising such material.

An object of the invention is to provide a novel method and apparatus by which a molten, refractory or vitreous material, such as molten glass, flowing in a continuous stream or streams, is reduced to filaments, matted, felted and separated into individual mats or pads. The glass wool or the like during this process may be introduced and packed in frames or containers to produce filter units or other articles, the manufacture of the glass wool and fabrication of such articles being carried out by a continuous process.

A further feature of the invention consists in the provision of a method and means for treating the wool with a suitable viscous oil or oily material applied to the wool immediately after it is blown into filaments and while still hot, the application of such material taking place during the continuous process by which the wool is manufactured.

Other objects and novel features of the invention will appear hereinafter.

In the accompanying drawings:

Figure 1 is a plan view of an apparatus for manufacturing glass wool and making air filters in accordance with the present invention.

Fig. 2 is a part sectional elevation of the same.

Fig. 2A is a detail sectional view of a blower.

Fig. 3 is a sectional elevation taken at the line III—III on Fig. 2.

Fig. 4 is a section at the line IV—IV on Fig. 2.

Fig. 5 is a fragmentary view showing a filter unit, its supporting frame, and an endless conveyor on which said frame is mounted.

Fig. 6 is a diagrammatic view showing the oiling system by which the glass wool is treated with oil or an oil-like substance.

The present application discloses certain subject-matter not claimed herein, which is shown and claimed in my copending application Serial Number 695,432, filed October 27, 1933. Such subject-matter relates particularly to the means for forming glass wool bats by blowing the fibrous material through a conduit into a series of receptacles passing across the discharge end of the conduit, the wool being blown into the receptacles by the force of the blast, the walls of the receptacles having openings to permit the passage of the gas therethrough while the wool accumulates in the receptacle.

Referring to the drawings, I have illustrated an apparatus designed for use in the manufacture of air filters. This apparatus, in general terms, comprises means for reducing streams of glass into filaments, treating the wool thus produced with a viscous oil or like substance, accumulating, compacting and felting the wool, and packing it into filter frames. The apparatus may comprise a plurality of trains of mechanisms arranged side by side, two such trains being shown in Fig. 1. This permits the simultaneous manufacture of glass wools of different fineness for purposes which will be pointed out hereinafter. As these two trains or lines of apparatus are substantially alike in construction, a detailed description of one will suffice for both.

Molten glass is supplied from a forehearth or extension 10 of a glass melting furnace and issues in continuous streams 11 from outlet openings extending through the floor of the forehearth. The rate of flow is controlled by refractory plugs 12 which project downward into said openings. The plugs may be adjusted vertically by any conventional means (not shown) to regulate the rate at which the glass issues.

Each stream of glass is directed through a blower 13 (Figs. 2 and 2A) by which the glass is reduced to threads or filaments, in which condition it is commonly referred to as glass wool. The blower is in the form of a ring having a hollow, tapered or frusto-conical core 14 extending therethrough, providing a passageway for the glass. Surrounding the core 14 is an annular chamber 15 to which steam or other gas under pressure is supplied from a pipe 16. A valve 17 permits regulation or shutting off of the flow. The steam issues from the pressure chamber through an annular passageway or series of openings 18. These openings which surround the core 14 are so inclined that they provide a convergent flow of the steam which is thus concentrated at a focal point 19 where it impinges on the stream of glass. The force of the steam is sufficient to draw or reduce the glass to fine threads or filaments.

The glass wool 20 thus produced is blown by the steam pressure into a tunnel 22 which, as shown, extends forwardly and is somewhat upwardly inclined. The tunnel is supported in an elevated position by means of a framework including vertical standards 23. Inclined frame pieces 24, parallel with the tunnel 22, are secured to the upper ends of the standards 23. Brackets 25 on the frame pieces 24 support the tunnel 22. An endless belt conveyor 26 is trained over rolls 27 and 27a mounted on the framework at or near the ends of the frame members 24. The upper lead of the conveyor 26 extends through the tunnel 22 and forms the floor thereof. The margins of the conveyor belt 26 may overlie the lower inturned margins of the tunnel walls, as shown in Fig. 4. Rolls 27b may be arranged at intervals along the conveyor belt in position to support it.

The conveyor 26 is driven continuously by an electric motor 28 having driving connections with the roll 27, said connections including a speed changing device 29. The glass wool 20 is conveyed through the tunnel 22 by the combined action of the steam pressure supplied through the blower, and the belt conveyor 26, and is discharged from the forward end of the tunnel into a vertical chute or receptacle 30. The wool passes downward through the chute 30 to a horizontally disposed bottom conveyor therebeneath, which comprises endless chains 31 running over sprocket wheels 32 and 33, and cross bars 31a connecting the chains. Metal holders 34 are attached to said cross bars. These holders are in the form of square or rectangular boxes, each comprising a flat bottom 35 (Fig. 5), side walls 36, and end walls 37. The holders 34 are arranged so that their ends abut. Each holder 34 is designed to receive a filter frame or frame section 38, in which the glass wool is deposited.

The bottom conveyor is driven by an electric motor 40 (Fig. 1) which has driving connections, including a speed changing device 41, with a drive shaft 42 (Fig. 5) on which the sprocket wheels 32 are mounted. The conveyor is thus driven continuously, causing the holders 34 with the filter frames 38 therein to pass in succession beneath the chute 30. Each filter frame thus receives a supply of the glass wool which is deposited therein in a rather loose condition.

In order to compress and pack the wool into the filter frames, a packing device is arranged in advance of the chute 30. This comprises an endless belt 43 which passes over rolls 44, 45 and 46. The belt is mounted on a downwardly and forwardly inclined frame 47. The belt comprises a lead 48 which extends from the roll 45 downwardly and forwardly to the roll 46, the latter being positioned just above the metal holders 34. As shown in Fig. 1, both belts 43 are driven from the same electric motor 50 having driving connections with the belts including a speed changing device 51. The motor 50 is driven in a direction to cause the lead 48 of the packer belt to travel in a forward and downward direction, thereby compressing the glass wool and packing it into the filter frames 38.

A cutter roller 52 (Figs. 1 and 2) is positioned a short distance forward of the packing belt 43 and arranged to roll over the frames 34 as they advance. The roller is journaled in the upper ends of arms 53 which are pivotally connected at their lower ends to the supporting frame for the bottom conveyor. The roller may be made of iron or other heavy material and bears with sufficient pressure on the rather sharp edges of the metal holder 34 to sever the glass wool which extends over said edges, thus separating the pads of wool in the filter frames and trimming their edges. The roller is preferably arranged in a diagonal position, as shown, with one end somewhat in advance of the other, which renders it more effective and reliable as a cutter.

In order to render the glass wool more effective as a filtering medium, it is treated with an oil or oily substance to which dust and other foreign particles in the air will adhere. This oil has a powerful affinity for dust, so that a filter of comparatively coarse open wool which has been treated with the oil will effectively clean the air passing therethrough. The method in general use for treating fibrous materials with oil in the manufacture of air filters, consists in dipping the material in a bath of oil and then draining it. The oil continues to drip from the material for an indefinite period of time and usually throughout the entire life of the filter. This is an objectionable feature and necessitates the use of pans or other contrivances to catch the drip while the filter is in use.

In accordance with the present invention, I treat the glass wool with an oil which does not run or drip at working temperatures. It preferably comprises a heavy oil refined to a point where it is free from odor and contains about 25% of wax. This product has a low cold test, so that it remains liquid or viscous at a low temperature. It is sufficiently liquid or viscous to effectively catch and retain the dust from the air at a temperaure of 20° F. below zero. It can also be raised to a temperature of 125° F. or higher without becoming sufficiently liquid to run or drip.

In practicing my invention, I apply the oil to the glass wool by means of apparatus presently to be described, while the wool is still hot or warm. The application of the oil to the wool in this manner before cooling takes place is important for the following reasons: It permits the oil to be more effectively applied than with the ordinary method of dipping the wool in an oil bath. With the latter method, the oil does not adhere sufficiently to the glass and, further, does not prevent deterioration of the glass which becomes more and more brittle and has a tendency to crumble. The deterioration of the glass wool when not treated with oil or when treated in the usual manner, is believed to be due to the adsorption or condensation of air and moisture on the surface of the glass. This surface condensation takes place because at the time the glass is reduced to wool the molecules of glass are unsaturated, causing adsorption of air and moisture. This air and moisture enters the microscopic fissures or cracks on the surface of the glass, gradually extending and enlarging them so that the glass becomes more and more brittle. This surface condensation also prevents adherence of the oil if the latter is applied after such adsorption takes place. According to the present invention, the oil is applied to the glass wool immediately or very shortly after it passes through the blower and while still hot or warm and before such adsorption takes place.

The apparatus for applying the oil will now be described. Referring to Fig. 6, a supply of heavy oil, such as above described, is maintained in a storage tank 60 to which the oil is supplied from drums 61. An electric motor 62 drives a pump 63 by which the oil is pumped from the drums 61 and forced through a pipe 64 into the storage tank. The oil when pumped into the tank 60 is at a temperature of about 250° F. or higher and as the tank is heavily insulated remains at a substantially constant high temperature. The oil is fed by gravity from the tank 60 through a pipe 65 to a supply tank 66. The flow of oil to the tank 66 is controlled by a float valve 67 so that the oil is maintained at a substanially constant level in the supply tank.

A pump 68 driven by a motor 69 draws the oil from the supply tank 66 and forces it through pipes 70, 71 and 72 to spray nozzles 73 (Figs. 3 and 6). Air under pressure is supplied through an air pressure pipe 74 and branch pipes 75 to the nozzles 73 and mixes with the oil. The nozzles, as shown in Fig. 3, are positioned at the upper end of the chute 30, above the glass wool passing from the tunnel 22 into said chute. The mixture of air and oil issues from the nozzles in the form of a spray which is directed downward with considerable force onto the glass wool which is thereby entirely coated with the hot oil. The pump 68 applies considerable pressure to the oil which is supplied to the nozzles. As the amount of oil supplied through the pump 68 is in excess of that fed through the nozzles, a return pipe 76 is provided through which the excess of oil is returned to the tank 66. A relief valve 77 in the return pipe controls the pressure at which the oil is supplied to the nozzles.

The chute 30 is preferably made with double walls, each comprising an inner wall 80 and an outer wall 81 (Fig. 3) spaced apart to provide a channel through which steam or other heating medium may be circulated. The steam may be supplied to these channels through intake pipes 82 at the upper ends of the double walls and after passing downward through the channels is exhausted through outlet pipes 83 at the lower end of the chute. The steam serves to keep the interior walls of the chute hot, thereby preventing the oil from congealing and accumulating on said walls. The steam further serves to maintain a sufficiently high temperature within the chute to insure an effective application to the wool of the oil supplied through the nozzles 73. As shown, the side walls of the chute 30 are arranged to permit the lower ends thereof to be adjusted laterally and thereby adjust the width of the chute to correspond to the width of the bottom conveyor. In order to hold the side walls in adjusted position they are provided with side flanges or wings 84 formed with slots 85 to receive clamping bolts 86 by which said wings are clamped in stationary plates or flanges 87.

The operation may be summarized as follows: Molten glass flows in continuous streams 11 from the feeder boot 10 and passes through blowers 13. Each blower supplies steam under pressure in converging jets which are focused on the stream of glass so that the glass is drawn through the blower by the force of the steam and reduced to fine threads or filaments which are blown by the steam into the channel 22. The combined force of the steam and pull of the conveyor 26 which forms the bottom of said channel, carries the glass wool forward and deposits it in the upper end of the vertical chute 30. The nozzles 73 direct sprays of heated oil on the glass which is still hot or warm. The oil spray is supplied in sufficient quantity and with ample force to completely and thoroughly coat the individual filaments with a surface coating of the oil. The force of the oil spray directed downwardly on the glass, combined with the action of gravity, carries the matted glass wool downward through the chute 30 and deposits it in the filter frames 38 (Fig. 5) within the metal holders 34. These holders are attached to the bottom conveyor 31, 31ª which travels continuously beneath the chute 30 so that each said filter frame as it passes beneath the chute 30 receives a quota of the glass wool. As the metal holders 34 and filter frames 38 therein advance beyond the chute 30 the wool is packed therein by the packer belt 43 located just in advance of the chute 30. This completes the matting and felting process. Any wool which overhangs or projects beyond the walls of the holders 34 is trimmed off by the cutter roller 52 positioned just in advance of the packer belt 43, said roller being rotated by means of its engagement with the upper edges of the metal holders 34 traveling therebeneath.

The feeders and blowers for one of the two parallel trains of mechanisms shown in Fig. 1 may be adjusted to produce a comparatively coarse wool, while the feeders and blowers for the other train of mechanisms are adjusted to provide a fine wool. As each holder 34 nears or reaches the roll 32 at the forward end of the bottom conveyor, the filter frame 38 therein is lifted out by an attendant. The filter frames taken from one botom conveyor and containing the fine wool are complemental to the filter frames taken from the other conveyor and containing the comparatively coarse wool. Each filter frame taken from one conveyor and containing a pad of glass wool of one fineness is telescopically combined with a frame taken from the other conveyor and containing a pad of different fineness, thereby making a complete filter unit comprising two superposed layers of wool, one comparatively coarse and the other comparatively fine, enclosed in a telescopic frame. The frame sections may be fastened together by any approved means.

Although I have particularly described my invention as constructed and used for making filter units, it will be understood that it may also be adapted and used for making various other articles. For example, the apparatus may be adapted to the manufacture of an insulating blanket of glass wool. For this purpose, the holders 34 may be omitted. The glass wool is then deposited from the chute 30 on a bottom sheet of covering material placed on and traveling with the conveyor. A top sheet of covering material may be applied after the glass wool passes beyond the packer belt. The whole may then be stitched or fastened together, forming a continuous glass wool filled blanket or quilt.

Modifications in the construction, materials used, and mode of operation may be resorted to within the spirit and scope of my invention.

What I claim is:

1. The combination of means for flowing a stream of molten glass, a blower arranged to blow the glass and reduce it to filaments, means for receiving said filaments and accumulating them to form glass wool, a vertically disposed chute, means for directing said wool into the upper end of the chute, a horizontally traveling conveyor beneath the chute, individual holders arranged in a row on said conveyor and traveling therewith, said holders being carried in succession to a receiving position beneath and in alignment with the chute and each receiving a quota of said wool, the lower open end of the chute being substantially coextensive laterally with the holder therebeneath and in close proximity thereto while the holder is in said receiving position, and means for compressing the wool within said holders as they travel with the conveyor, said compressing means comprising an endless belt having a downwardly and forwardly inclined lead arranged over the conveyor in position to bear on said mass and advancing with said conveyor.

2. The combination of means for flowing a stream of molten glass, a blower arranged to blow the glass and reduce it to filaments, means for receiving said filaments and accumulating them to form glass wool, a vertically disposed chute with downwardly convergent sides and of greater height than lateral dimensions, means for directing said wool into the upper end of the chute, a horizontally traveling conveyor beneath the chute, individual holders arranged in a row on said conveyor and traveling therewith, said holders being carried in succession to a receiving position beneath and in alignment with the chute and each receiving a quota of said wool, the lower open end of the chute being substantially coextensive laterally with the holder therebeneath and in close proximity thereto while the holder is in said receiving position, means in advance of the chute for compressing said wool into said holders, said compressing means comprising an endless belt having a downwardly and forwardly inclined lead arranged over the conveyor in position to bear on said mass and advancing with said conveyor, and means in advance of said compressing means to trim said wool along the margins of said holders.

3. The combination of a horizontally disposed endless conveyor, end rolls over which the conveyor runs, a series of receptacles attached intermediate their ends to the conveyor and extending lengthwise of said conveyor and traveling therewith, said receptacles arranged with their adjacent ends abutting, while moving horizontally with the conveyor and separated while the receptacles are passing over said end rolls, a chute over said conveyor beneath which said receptacles are carried in succession to a position in alignment with the chute, means for feeding glass wool downward through the chute and causing a quota thereof to enter each receptacle as it passes beneath the chute, the lower open end of the chute being substantially coextensive laterally with the receptacle therebeneath and in close proximity thereto when the receptacle is in said position of alignment and receiving its quota of wool, means for compressing the wool into said receptacles after they pass beyond the chute, and means for trimming the wool along the edges of said receptacles after they have passed beyond said compressing means.

4. The combination of a horizontally disposed endless conveyor, a series of receptacles supported on and extending lengthwise of said conveyor and traveling therewith, said receptacles arranged with their adjacent sides abutting, a chute over said conveyor beneath which said receptacles are carried in succession to a position in alignment with the chute, means for feeding glass wool downward through the chute and causing a quota thereof to enter each receptacle as it passes beneath the chute, the lower open end of the chute being substantially coextensive laterally with the receptacle therebeneath and in close proximity thereto when the receptacle is in said position of alignment and receiving its quota of wool, a downwardly and forwardly inclined packing belt arranged to travel over the said conveyor at a point beyond said chute and operating to compress the wool within said receptacles, and a roller arranged to bear on the receptacles after they have passed beyond the packing belt, and rotated by the forward travel of said receptacles whereby it is caused to roll over the upper edges of the receptacles and thereby trim the wool along said edges.

5. The combination of means for reducing molten glass to the form of wool and accumulating it in a loose mass, means providing a confined passageway through which the wool passes, means for applying to the wool a protective coating of a substance which while hot is in a liquid condition, said substance being applied to the accumulated wool before its passage through said passageway, and means for heating the walls of said passageway and thereby maintaining a high temperature therein.

6. The combination of means for reducing molten glass to filaments and accumulating said filaments in the form of wool, a chute positioned to receive said wool before the latter is cooled to atmospheric temperature, said chute providing a confined passageway through which the wool is directed, means for applying to the wool entering the chute a coating of an oily material which is hot and in a liquid condition, and means for heating the walls of said chute and thereby maintaining said passageway at a high temperature.

7. The combination of means for reducing molten glass to filaments and accumulating said filaments in the form of wool, a chute positioned to receive said wool before the latter is cooled to atmospheric temperature, said chute providing a confined passageway through which the wool is directed, means for supplying a coating material which is liquid at super-atmospheric temperatures, means for mixing said liquid with a hot gas, and means for directing a blast of said mixture against the wool entering the chute, thereby coating the wool with said substance and forcing the wool through said chute.

8. The combination of means for reducing molten glass to filaments and accumulating said filaments in the form of wool, a chute positioned to receive said wool before the latter is cooled to atmospheric temperature, said chute providing a confined passageway through which the wool is directed, means for supplying a coating material which is liquid at super-atmospheric temperatures, means for mixing said liquid with a hot gas, means for directing a blast of said mixture against the wool entering the chute, thereby coating the wool with said substance and forcing the wool through said chute, said chute comprising double walls spaced to provide a heating chamber, and means for circulating steam through said chamber, thereby maintaining a high temperature within said chute.

9. The combination of an endless chain conveyor, sprocket wheels mounted to rotate about horizontal axes and over which said conveyor is trained, rectangular holders attached to said conveyor, each said holder comprising a bottom, side walls and end walls, the end walls of each holder abutting the end walls of the adjoining holders while traveling between said sprocket wheels, and separated from the said end walls of the adjoining holders while passing over the sprocket wheels, means for continuously driving the conveyor, a vertically disposed chute, means for supplying glass wool to the chute, said conveyor and holders being arranged to travel beneath the lower open end of the chute, means for directing a force downwardly against the wool in the chute and cooperating with gravity for forcing the wool through the chute and causing each said holder to receive a quota thereof, said open end of the chute being substantially laterally coextensive with a holder therebeneath when the holder is in position to receive its quota of wool, means positioned over the conveyor at a point beyond the chute for packing the wool in said holders, and a trimming device positioned beyond said packing means for trimming the wool along the edges of said holders.

10. The combination of an endless chain conveyor, sprocket wheels over which said conveyor is trained, rectangular holders attached to said conveyor, each said holder comprising a bottom, side walls and end walls, the end walls of each holder abutting the end walls of the adjoining holders while travelling between said sprocket wheels, and separated from the said end walls of the adjoining holders while passing over the sprocket wheels; means for continuously driving the conveyor, a vertically disposed chute, means for supplying glass wool to the chute, said conveyor and holders being arranged to travel beneath the lower open end of the chute, means for directing a force downwardly against the wool in the chute and cooperating with gravity for forcing the wool through the chute and causing each said holder to receive a quota thereof, said open end of the chute being substantially laterally coextensive with a holder therebeneath when the holder is in position to receive its quota of wool, means positioned over the conveyor at a point beyond the chute for packing the wool in said holders, and a trimming roll having a stationary mounting over the conveyor at a point beyond said packing means, said trimming roll bearing on the upper edges of the walls of said holders and operable to trim the wool along said edges.

11. The method of continuously forming a web of matted or felted fibrous material, which comprises flowing a stream or streams of molten refractory material, reducing the same to fine fibers, cooling and solidifying the fibers, intermingling the fibers as they are formed, causing the intermingled fibers to accumulate on a traveling conveyor to a depth greater than the thickness of the web which is being formed, with said accumulation confined to predetermined lateral dimensions, and causing a continuous advance of a layer of the accumulated fibers with the conveyor in the form of a continuous web.

12. The method of continuously forming a matted web of fibrous material, which comprises flowing a molten material in stream formation, attenuating the flowing material to the form of filaments, cooling and solidifying the filaments as they form, intermingling the filaments and advancing them through a chute, continuously advancing a conveyor across the discharge end of the chute, causing the filaments within the chute to accumulate in loosely matted mass formation over the conveyor to a depth substantially greater than the web which is being formed, and causing a continuous withdrawal from the accumulated mass of matted fibers, of that portion thereof adjacent to the conveyor and their advance with the conveyor in the form of a web.

13. The combination of means for reducing molten glass to the form of fibers and accumulating them in a loose mass, means providing a confined passageway through which the fibers pass, means for applying to the fibers before they have cooled, a substance which, while hot, is in a liquid condition, and means for maintaining a high temperature within said passageway.

14. The combination of means for reducing molten glass to filaments and accumulating said filaments in bulk form, means providing a passageway through which the accumulated filaments are caused to pass before they are cooled to atmospheric temperature, means for applying to the filaments before entering said passageway a coating material which, while hot, is in a liquid condition, and means for surrounding said passageway with a high temperature medium by which said fibers are maintained at a superatmospheric temperature while within said passageway.

DONALD C. SIMPSON.